United States Patent Office.

ROBERT ALEXANDER BEATTIE, OF PHILADELPHIA, PENNSYLVANIA.

Letters Patent No. 109,485, dated November 22, 1870.

IMPROVEMENT IN VARNISHES.

The Schedule referred to in these Letters Patent and making part of the same.

I ROBERT ALEXANDER BEATTIE, of Philadelphia, in the county of Philadelphia, State of Pennsylvania, have invented an Improved Varnish, of which the following is a specification.

Nature and Object of the Invention.

My invention consists of a varnish composed of the ingredients and according to the proportions of ingredients, substantially as described hereafter, so that it will dry quickly after being applied, and will present a smooth, hard, polished surface, impervious to moisture.

My invention further consists in combining acetone with the said varnish, so as to render the latter less sticky and more easy to spread.

General Description.

I dissolve about two pounds and a half of pure shellac in about one gallon of alcohol, (No. 95.) To this compound, which forms the base or body of the varnish, I add about two ounces of wood-naphtha, the latter possessing the property of rendering the varnish water-proof and making it tough and hard.

The varnish thus made may be applied to surfaces with a brush, but I prefer to use a sponge, which, as it retains a mass of the varnish, will afford a better medium than a brush for spreading the same evenly and smoothly before it becomes dry.

In order to render the varnish less sticky and more easy to spread, I mix with the above composition of shellac, alcohol, and wood-naphtha, about one ounce of acetone, and, as a coloring matter, I sometimes grind with the varnish, compounded as above, about ten grains of drop-lake.

The varnish, independently of the hard, smooth, polished surface which it imparts, dries quickly, and is impervious to either hot or cold water five minutes after it is applied.

Claim.

A varnish consisting of the within-named ingredients, combined as set forth.

In testimony whereof, I have signed my name to this specification in the presence of two subscribing witnesses.

ROBERT A. BEATTIE.

Witnesses:
J. M. HOLGAN,
FRANK B. RICHARDS.